Nov. 11, 1941.          V. F. ZAHODIAKIN          2,262,311
                           PISTON RING
                        Filed July 13, 1939
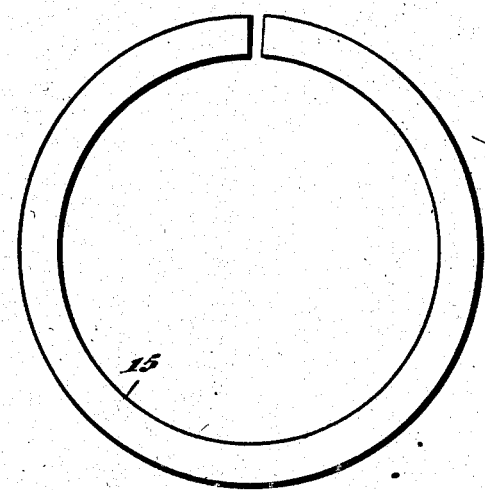
Fig.1
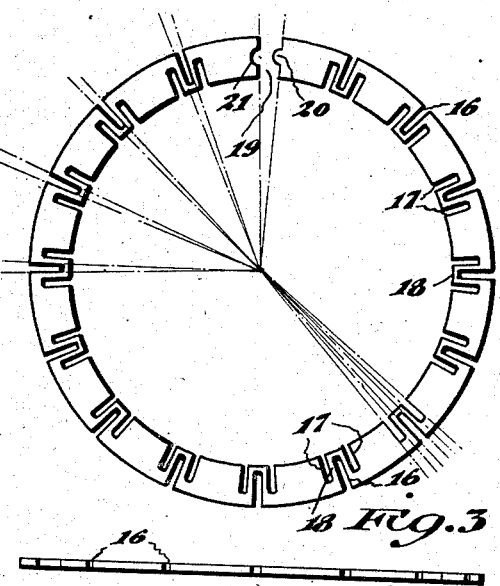
Fig.3
Fig.2
Fig.4
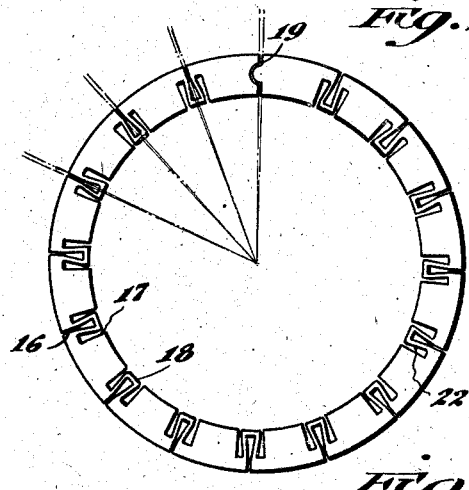
Fig.5
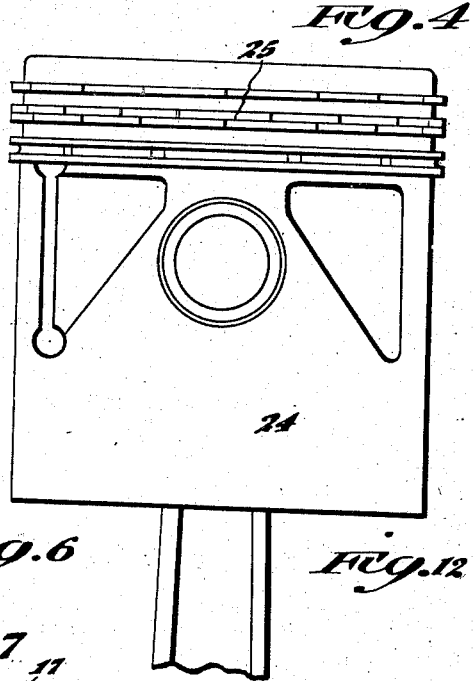
Fig.12
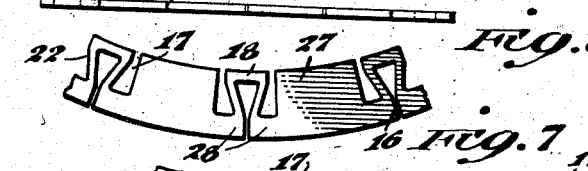
Fig.6
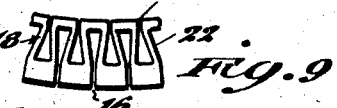
Fig.7
Fig.8          Fig.9
Fig.10
Fig.11
INVENTOR
Victor F. Zahodiakin
BY Wood & Wood
ATTORNEYS

Patented Nov. 11, 1941

2,262,311

UNITED STATES PATENT OFFICE 2,262,311

PISTON RING

Victor F. Zahodiakin, Forest Hills,
Long Island, N. Y.

Application July 13, 1939, Serial No. 284,228

2 Claims. (Cl. 309—44)

This invention relates to improvements in packing or compression rings of the type adapted to be used with pistons. The improved ring of this invention particularly lends itself to use as a compression ring for the pistons of internal combustion engines but is not limited to this use. It is capable of use, with the same advantages, as the packing ring for the pistons of pumps, steam engines, or any installation where packings of this general type are employed.

It has been one of the objects of the present inventor to provide a piston ring adapted to the above uses which will readily and easily conform to any irregularity in the contour of a cylinder, and in this respect is of great value for use in worn cylinders. In other words, the purpose has been to provide a ring which will conform to localized irregularities or distortions as well as to general irregularities.

It has been a further object of the inventor to provide a piston ring which can be made in an extremely simple manner by a few operations of the utmost simplicity. In this connection it has been a further object to provide an improved method of forming a piston ring. More specifically, the ring may be made by punch press operation and the simple expedient of pressing the ring after stamping.

Specifically described, the present inventor has realized the value of distributing, around the circumference, the normal gap which must be provided in a piston ring to permit expansion and contraction and toward this end has arranged the gap in minute divisions around the entire circumference of the ring. Now to fabricate a ring with these minute clearances has presented an extremely difficult problem.

The conception here has been to punch a flat washer-like ring to provide radial slots, the tools punching said slots being of sufficient width for performing the operation without damage to the tools. In other words, it is not possible to provide or use punching tools of the width of the finished slots. After the slots are punched the ring is compressed radially, inwardly, for the purpose of reducing the width of the slots to something infinitesimal such as four-thousandths or five-thousandths of an inch. Thus, the result is a ring formed by punch press operation which provides the maximum flexibility and at the same time does not include slots wide enough to permit loss of compression. After the ring has been compressed to its finished size the slots, or slits, are of sufficient size to permit expansion and contraction without loss of compression.

The ring thus formed is extremely flexible and may be readily compressed for insertion into the cylinder. It will promptly adjust itself to the irregularities of the cylinder without mechanical fitting of the character required with the rings of the past. The method disclosed in this application is described and claimed in a copending application, Serial No. 384,149, filed Mar. 19, 1941, entitled "Method of making a piston ring."

Other objects and certain advantages of the invention will be more fully apparent from a description of the drawing in which:

Figure 1 is a top plan view of the flat washer-like ring or blank from which the piston ring is formed.

Figure 2 is an edge view of the ring of Figure 1.

Figure 3 is a top plan view of the ring of Figure 1 showing it after the punch press operation.

Figure 4 is an edge view of the ring of Figure 3.

Figure 5 is a top plan view showing the ring after it has been compressed for the purpose of reducing it to its finished size and closing the slots to the desired widths.

Figure 6 is an edge view of the ring of Figure 5.

Figure 7 is an enlarged fragmentary view of a portion of Figure 5.

Figure 8 is a fragmentary top plan view showing a portion of a modified form of ring.

Figure 9 is a fragmentary top plan view of the ring of Figure 8 showing it compressed to its finished size.

Figure 10 is a fragmentary top plan view of a further modification of the ring wherein a considerable portion of the metal of the ring is cut away for reduction in weight.

Figure 11 is a fragmentary top plan view of the ring of Figure 10 showing the ring compressed to finished size.

Figure 12 is a side view of a piston showing the compression rings of this invention installed in position in the piston.

Referring to the drawing, a flat strip of metal is rolled into the form of a flat washer-like ring 15 (Figure 1). This flat washer-like ring is subjected to a punching or stamping operation to produce a slotted arrangement (Figure 3). The sets of slots may be spaced as for example so as to occur at intervals of twenty-two and a half degrees or they may be closer together as shown in the modifications. The slots are formed radially in all instances, that is to say, the edges of the slots are on radial lines.

Each set of slots provides one slot, indicated at 16, cut into the outer periphery of the ring and two slots, indicated at 17, cut in the inner periphery of the ring at each side of the slot 16. Thus a more or less U-shaped portion of metal is formed, indicated at 18. The ring is split as at 19 to include the tongue 20 and groove 21 interfitting when the ring is compressed.

The punching tools which punch the formed slots are of sufficient width and strength for the purpose indicated. Accordingly the slots as originally produced are relatively wide and open.

The steel preferably used in the fabrication of this ring has the following approximate analysis: Carbon, .45 to .55; manganese, .60 to .90; chrome, .80 to 1.10; vanadium, .15 to .18. This metal is sufficiently ductile before heat treatment to permit the punch press formation of the slots and to permit the subsequent operation of compressing the ring to its finished size. In the next operation, the ring is compressed into the position shown in Figure 5. As a result of this the throats of the U-shaped portions are greatly reduced in width and the arms 22 of the portions are bent to positions angular with respect to radial lines. Thus the U-shaped portions become V-shaped.

The operation of compressing the ring reduces the width of the outer slots or throats to something minute, such as approximately four-thousandths or five-thousandths of an inch. The aggregate width of all these slots is no more than the width of the gap of the average piston ring. Likewise, the split portion 19 of the ring may be reduced to approximately four or five thousandths of an inch or completely closed. Dies engaging the top and bottom of the ring press it to an absolutely flat condition and remove any irregularities resulting from the compressing operation.

Thus it is provided that the ring may be formed by the simple expedients of punching and pressing operations with the finished product having slots of the fractional widths specified. It will be obvious that this ring will then flex locally as well as generally and will readily conform to any irregularity in the contour of the cylinder wall. The rings may be installed in the piston 24 singly or in pairs as indicated at 25 (Figure 12).

When the ring is completely formed and set it should be properly treated to provide a ring of the maximum hardness and spring tension. For this purpose it should be heated to approximately 1450–1500 degrees Fahrenheit, then quenched in oil, and then drawn to reduce brittleness and to obtain the desired hardness which is accomplished by heating to a temperature of from 600 to 800 degrees Fahrenheit. After this operation the circumference of the ring may be ground to provide a ring of the exact desired size and having a fine finish.

If desired, the notches or slots may be closely related as shown in Figure 8 to provide a uniform zigzag pattern. Also if desired the portion of metal 26 between the U-shaped flexible portions may be entirely cut away as indicated at 27 for the purpose of reducing the weight and mass of the ring. As stated, in the compressing operation the U-shaped portions become V-shaped, that is to say, their throats are substantially closed and the side walls become angular with respect to the radial lines.

Those portions 28 of the ring at either side of the central or outer slot must be of greater diametrical width than the thickness of the metal of the ring inasmuch as this portion is not to be flexible. Now any portion of the metal which has been described as U-shaped, particularly the arms, must be of a width which is the same as the thickness of the metal of the ring or less. This must be so because the U-shaped portion of the ring must be flexible and it is obvious that it could not be flexible if the width were greater than the thickness.

The type of ring described in this application generates circumferential pressure by the V-form portions. The tension which the ring usually exerts on the cylinder wall in which the ring is adapted to reciprocate will be easily controlled by increase or decrease in the width of the throats in the outer periphery of the ring.

Having described my invention, I claim:

1. A piston ring consisting of a thin, flat washer element, said element having a plurality of segments separated by throats, said segments being connected at their inner corners by integral resilient loops, the side portions of said loops diverging inwardly gradually and being spaced apart a substantial distance at their inner ends, and the walls of said throats being disposed on radial lines, whereby said ring is circumferentially and radially flexible.

2. A piston ring consisting of a thin, flat washer element, said element having a plurality of segments separated by minute throats, said segments being connected at their inner corners by integral resilient loops, said loops being of triangular form and providing diverging side walls and circumferentially disposed inner walls of substantial length, and the walls of said throats being disposed on radial lines, whereby said ring is circumferentially and radially flexible.

VICTOR F. ZAHODIAKIN.